US010507418B2

(12) United States Patent
Liu

(10) Patent No.: US 10,507,418 B2
(45) Date of Patent: Dec. 17, 2019

(54) DEVICE FOR BEATING DUST AND DUST COLLECTOR USING SAME

(71) Applicant: JIANGSU MIDEA CLEANING APPLIANCES CO., LTD., Suzhou (CN)

(72) Inventor: Shenghui Liu, Suzhou (CN)

(73) Assignee: JIANGSU MIDEA CLEANING APPLIANCES CO., LTD., Jiangsu (CN)

( * ) Notice: Subject to any disclaimer, the term of this patent is extended or adjusted under 35 U.S.C. 154(b) by 200 days.

(21) Appl. No.: 15/620,379

(22) Filed: Jun. 12, 2017

(65) Prior Publication Data

US 2017/0274310 A1    Sep. 28, 2017

Related U.S. Application Data

(63) Continuation of application No. PCT/CN2015/084823, filed on Jul. 22, 2015.

(30) Foreign Application Priority Data

Dec. 12, 2014 (CN) .......................... 2014 1 0768163
Dec. 12, 2014 (CN) ..................... 2014 2 0787717 U (Continued)

(51) Int. Cl.
*B01D 46/00* (2006.01)
*A47L 9/20* (2006.01)
(Continued)

(52) U.S. Cl.
CPC ............ *B01D 46/0065* (2013.01); *A47L 9/20* (2013.01); *B01D 46/521* (2013.01); *A47L 9/106* (2013.01); *A47L 11/4033* (2013.01)

(58) Field of Classification Search
CPC ................ B01D 46/00; B01D 46/0064; B01D 46/0065; B01D 46/521–527; A47L 9/106; A47L 9/122; A47L 9/20; A47L 11/4033
(Continued)

(56) References Cited

FOREIGN PATENT DOCUMENTS

CN          2892953 Y      4/2007
CN        102078166 A      6/2011
(Continued)

OTHER PUBLICATIONS

Jiangsu Midea Cleaning Appliances Co., Ltd., Extended European Search Report, EP15868519.8, dated Mar. 1, 2018, 7 pgs.
(Continued)

*Primary Examiner* — T. Bennett McKenzie
(74) *Attorney, Agent, or Firm* — Morgan, Lewis & Bockius LLP

(57) ABSTRACT

A dust collector and a device for beating dust in the same. The dust collector (10) includes: a main body (101) with a clean air outlet (1011); a filter section (102) set at the clean air outlet (1011); and a device for beating dust. The device for beating dust includes: a sliding rail (103) set on the outside surface of the main body (101) and opposite to the clean air outlet (1011); a slider (104) slidably set on the sliding rail (103); a poker rod (105) rotatably set on the slider (104); and a beating dust member (106) used for beating the filter section (102) and set on the poker rod (105).

6 Claims, 3 Drawing Sheets

(30) Foreign Application Priority Data

Mar. 23, 2015 (CN) .......................... 2015 1 0128057
Mar. 23, 2015 (CN) ..................... 2015 2 0164725 U

(51) Int. Cl.
*B01D 46/52* (2006.01)
*A47L 11/40* (2006.01)
*A47L 9/10* (2006.01)

(58) Field of Classification Search
USPC .................................................. 55/295–300
See application file for complete search history.

(56) References Cited

FOREIGN PATENT DOCUMENTS

| CN | 103068290 | A | | 4/2013 |
|---|---|---|---|---|
| CN | 103462563 | A | | 12/2013 |
| CN | 203943625 | U | | 11/2014 |
| CN | 204520528 | U | | 8/2015 |
| DE | 752342 | C | * 2/1953 | ............... A47L 9/20 |
| DE | 752342 | C | | 2/1953 |
| EP | 1170049 | A1 | | 1/2002 |
| EP | 2601876 | A1 | | 6/2013 |
| GB | 554177 | A | | 6/1943 |
| JP | 2008178506 | A | | 8/2008 |

OTHER PUBLICATIONS

Jiangsu Midea Electrical Appliance Co., Ltd., First Office Action, CN201510128057.4, dated Mar. 22, 2018, 5 pgs. (No English Translation Available).
Jiangsu Midea Electrical Appliance Co., Ltd., Second Office Action, CN201510128057.4, dated Jun. 15, 2018, 17 pgs.

* cited by examiner

DEVICE FOR BEATING DUST AND DUST COLLECTOR USING SAME

PRIORITY CLAIM AND RELATED APPLICATION

This application is a continuation application of PCT Patent Application No. PCT/CN2015/084823, entitled "DEVICE FOR BEATING DUST AND DUST COLLECTOR USING SAME" filed on Jul. 22, 2015, which claims priority to Chinese Patent Application No. 201420787717.0, entitled "DEVICE FOR BEATING DUST AND DUST COLLECTOR USING SAME" filed on Dec. 12, 2014, Chinese Patent Application No. 201410768163.4, entitled "DEVICE FOR BEATING DUST AND DUST COLLECTOR USING SAME" filed on Dec. 12, 2014, Chinese Patent Application No. 201510128057.4, entitled "DEVICE FOR BEATING DUST AND DUST COLLECTOR USING SAME" filed on Mar. 23, 2015, and Chinese Patent Application No. 201520164725.4, entitled "DEVICE FOR BEATING DUST AND DUST COLLECTOR USING SAME" filed on Mar. 23, 2015, all of which are incorporated by reference in their entirety.

TECHNICAL FIELD

The present disclosure relates to a dust tapping-off device, and also to a cleaning appliance having the dust tapping-off device.

BACKGROUND

When a cleaning appliance has been used for a period of time, a filtering member of the cleaning appliance is blocked by dust and dirt gradually, such that a suction of the cleaning appliance is reduced, thereby decreasing a total cleaning efficiency of the cleaning appliance. In the current cleaning appliance, the filtering member needs to be removed firstly, and then can be cleaned. Therefore, there exists a defect in the current cleaning appliance that it is difficult to clean the filtering member.

SUMMARY

Embodiments of the present disclosure seek to solve at least one of the problems existing in the related art to at least some extent. Therefore, embodiments of the present disclosure provide a cleaning appliance, which has a simple structure, and is easy to clean and use.

Embodiments of the present disclosure further provide a dust tapping-off device for the cleaning appliance.

The cleaning appliance according to a first aspect of embodiments of the present disclosure includes: a body having a clean air outlet; a filtering member disposed at the clean air outlet; and a dust tapping-off device. The dust tapping-off device includes: a sliding rail disposed on an outer surface of the body and opposite to the clean air outlet; a sliding block slidably disposed on the sliding rail; an actuating rod rotatably disposed on the sliding block; and a dust tapping-off member disposed on the actuating rod and configured for tapping the filtering member.

The cleaning appliance according to embodiments of the present disclosure has a simple structure, and is easy to clean and use.

In addition, the cleaning appliance according to above embodiments of the present disclosure further has following additional technical features.

According to an embodiment of the present disclosure, the clean air outlet is disposed on an upper surface of the body, the upper surface of the body is provided with a first engaging lug and a second engaging lug, the first engaging lug is provided with a first engaging groove, and the second engaging lug is provided with a second engaging groove, the sliding rail includes a rail body, a first mounting portion and a second mounting portion, in which an upper end of the first mounting portion is connected to a first end of the rail body and a lower end of the first mounting portion is configured as a first fastener engaged in the first engaging groove, an upper end of the second mounting portion is connected to a second end of the rail body and a lower end of the second mounting portion is configured as a second fastener engaged in the second engaging groove.

A dust tapping-off device according to a second aspect of embodiments of the present disclosure includes: a sliding rail; a sliding block slidably disposed on the sliding rail; an actuating rod rotatably disposed on the sliding block; and a dust tapping-off member disposed on the actuating rod and configured for tapping the filtering member.

The dust tapping-off device according to embodiments of the present disclosure has a simple structure, and is easy to use.

According to an embodiment of the present disclosure, the sliding block has an accommodating cavity therein, both two opposite ends of the accommodating cavity are open, the sliding rail is configured to pass through the accommodating cavity, in which a first surface of the sliding rail is provided with a groove, a wall surrounding the accommodating cavity opposite to the first surface is provided with a protruding block, and the protruding block is configured to be fitted in the groove.

According to an embodiment of the present disclosure, the sliding block has an accommodating cavity therein, both two opposite ends of the accommodating cavity are open, the sliding rail is configured to pass through the accommodating cavity, the dust tapping-off device further includes a rolling element, the rolling element is rotatably disposed in the accommodating cavity and is disposed on the sliding rail, in which the actuating rod is configured to pass through walls surrounding the accommodating cavity and is connected to the rolling element.

According to an embodiment of the present disclosure, a first surface of the sliding rail is provided with a groove, and a part of the rolling element is configured to be fitted in the groove.

According to an embodiment of the present disclosure, the actuating rod has a first portion extending leftwards out of the sliding block and a second portion extending rightwards out of the sliding block, in which two dust tapping-off members are provided, one of the two dust tapping-off members is disposed on the first portion of the actuating rod and the other one of the two dust tapping-off members is disposed on the second portion of the actuating rod.

According to an embodiment of the present disclosure, the actuating rod is perpendicular to the sliding rail.

According to an embodiment of the present disclosure, the dust tapping-off member is configured as a cam.

According to an embodiment of the present disclosure, the dust tapping-off device further includes a handle, and the handle is disposed on the sliding block.

DETAILED DESCRIPTION OF EMBODIMENTS

Reference will be made in detail to embodiments of the present disclosure. The embodiments described herein with reference to drawings are explanatory, illustrative, and used to generally understand the present disclosure. The embodiments shall not be construed to limit the present disclosure.

Figure 1:
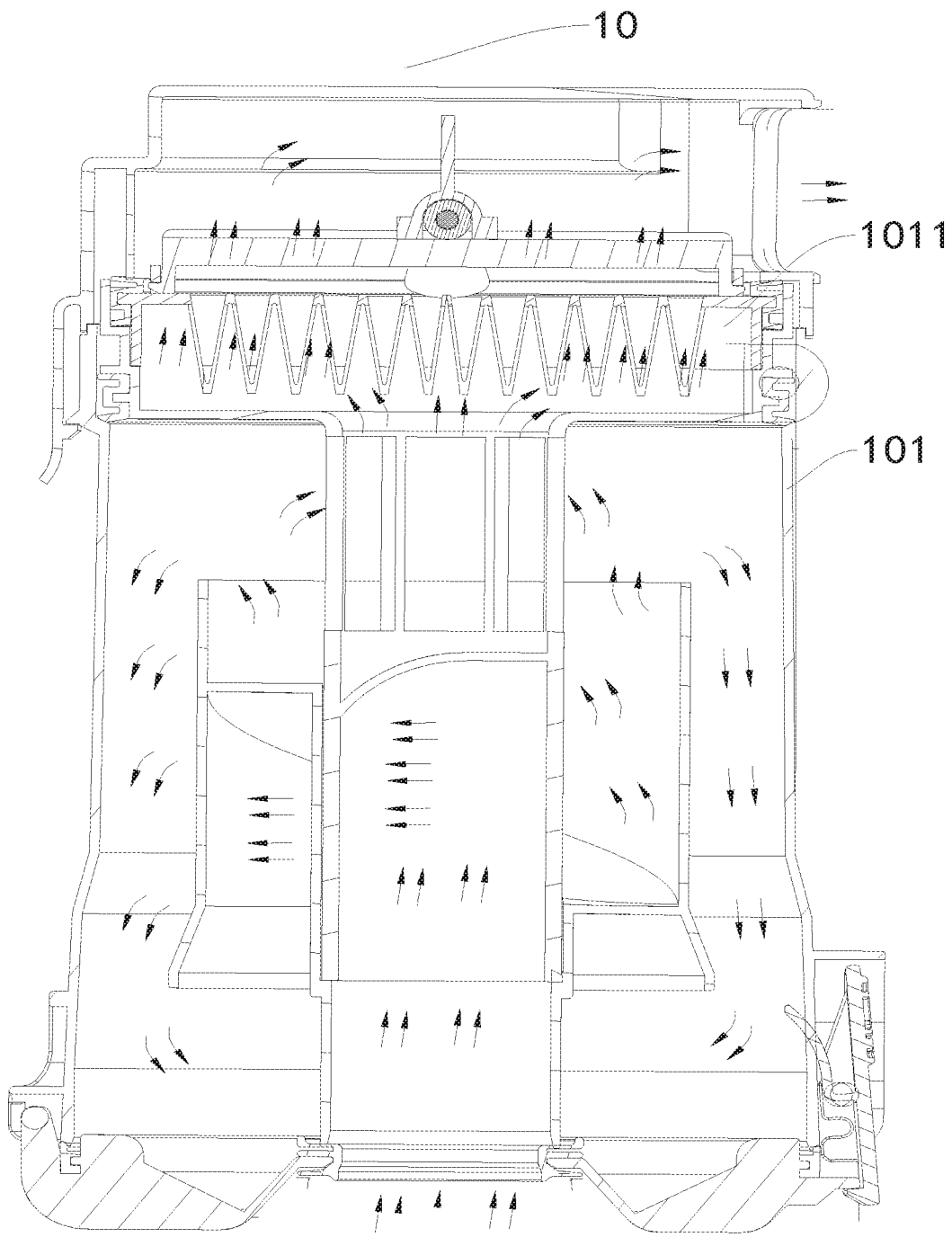
FIG. 1 is a sectional view of a cleaning appliance according to an embodiment of the present disclosure.
Figure 2:
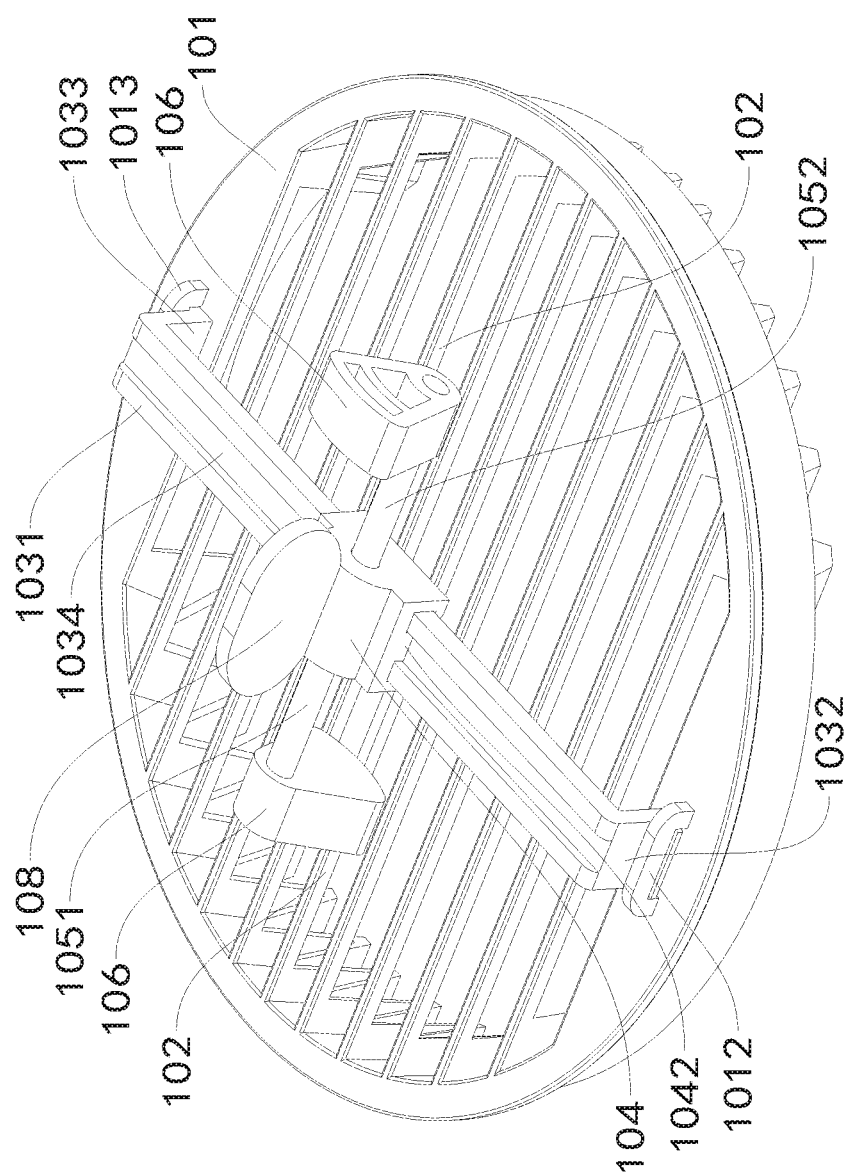
FIG. 2 is a partially schematic view of a cleaning appliance according to an embodiment of the present disclosure.
Figure 3:
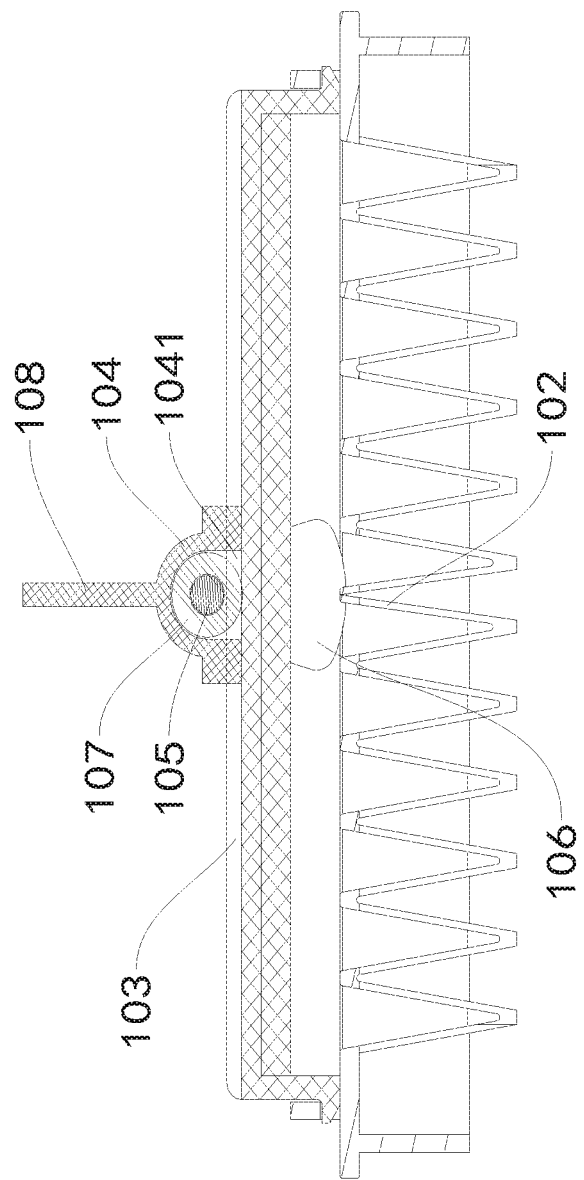
FIG. 3 is a partially sectional view of a cleaning appliance according to an embodiment of the present disclosure.

A cleaning appliance 10 according to embodiments of the present disclosure will be described with reference to drawings. As shown in FIGS. 1-3, the cleaning appliance 10 according to embodiments of the present disclosure includes a body 101, a filtering member 102 and a dust tapping-off device. The body 101 has a clean air outlet 1011, and the filtering member 102 is disposed at the clean air outlet 1011.

As shown in FIGS. 1-3, the dust tapping-off device according to embodiments of the present disclosure includes a sliding rail 103, a sliding block 104, an actuating rod 105 and a dust tapping-off member 106 configured for tapping the filtering member 102. The sliding rail 103 is disposed on an outer surface of the body 101 and opposite to the clean air outlet 1011. The sliding block 104 is slidably disposed on the sliding rail 103. The actuating rod 105 is rotatably disposed on the sliding block 104. The dust tapping-off member 106 is disposed on the actuating rod 105.

A dust tapping-off process of the cleaning appliance 10 according to embodiments of the present disclosure will be briefly described with reference to FIGS. 1-3. When the cleaning appliance 10 has been used for a period of time, the filtering member 102 is blocked gradually by dust and dirt, such that a suction of the cleaning appliance 10 is reduced, thereby decreasing a total cleaning efficiency of the cleaning appliance 10 (for example a vacuum cleaner). By rotating the actuating rod 105, the dust tapping-off member 106 mounted to the actuating rod 105 may be driven to rotate, so that the dust tapping-off member 106 may tap the filtering member 102. Furthermore, by driving the sliding block 104 to move along the sliding rail 103, the actuating rod 105 and the dust tapping-off member 106 are moved, so that the dust tapping-off member 106 may tap different parts of the filtering member 102, and thereby the whole filtering member 102 may be cleaned. That is to say, by providing the dust tapping-off device, the filtering member 102 does not need to be removed for cleaning.

In the dust tapping-off device according to embodiments of the present disclosure, by providing the rotatable actuating rod 105 and mounting the dust tapping-off member 106 to the actuating rod 105, the dust tapping-off member 106 may be rotated by rotating the actuating rod 105, so that the dust tapping-off member 106 may tap the filtering member 102, and thereby the filtering member 102 may be cleaned conveniently and easily.

Therefore, the dust tapping-off device according to embodiments of the present disclosure has a simple structure and is easy to use.

In the cleaning appliance 10 according to embodiments of the present disclosure, by providing the dust tapping-off device, the filtering member 102 may be cleaned conveniently and easily and the filtering member 102 does not need to be removed for cleaning. Therefore, the cleaning appliance 10 according to embodiments of the present disclosure has the simple structure, and is easy to clean and use.

The body 101 and the filtering member 102 of the cleaning appliance 10 according to embodiments of the present disclosure may be known. For example, the filtering member 102 may be configured to be a high efficiency particulate air filter (HEPA).

As shown in FIGS. 1-3, the cleaning appliance 10 according to some embodiments of the present disclosure includes the body 101, the filtering member 102 and the dust tapping-off device. The dust tapping-off device includes the sliding rail 103, the sliding block 104, the actuating rod 105, a handle 108 and the dust tapping-off member 106 configured to tap the filtering member 102.

The clean air outlet 1011 is provided in an upper surface of the body 101, i.e. the clean air outlet 1011 is opened upwards. The upper surface of the body 101 is provided with a first engaging lug 1012 and a second engaging lug 1013. The first engaging lug 1012 is provided with a first engaging groove, and the second engaging lug 1013 is provided with a second engaging groove. The sliding rail 103 includes a rail body 1031, a first mounting portion 1032 and a second mounting portion 1033.

An upper end of the first mounting portion 1032 is connected to a first end of the rail body 1031 and a lower end of the first mounting portion 1032 is configured as a first fastener engaged in the first engaging groove. An upper end of the second mounting portion 1033 is connected to a second end of the rail body 1031 and a lower end of the second mounting portion 1033 is configured as a second fastener engaged in the second engaging groove. Thus, the sliding rail 103 may be mounted to the body 101 easily and steadily.

Advantageously, the rail body 1031, the first mounting portion 1032 and the second mounting portion 1033 may be formed integrally. The clean air outlet 1011 may be configured as a round hole, and the rail body 1031 may extend along a radial direction of the clean air outlet 1011.

As shown in FIGS. 2 and 3, in an embodiment of the present disclosure, the sliding block 104 has an accommodating cavity 1041 therein, both two opposite ends of the accommodating cavity 1041 are open, and the sliding rail 103 passes through the accommodating cavity 1041. In other words, the sliding block 104 may be fitted over the rail body 1031. Thereby, the structure of the dust tapping-off device may be reasonable and steady.

Advantageously, a groove 1034 may be provided in an upper surface of the rail body 1031, a protruding block 1042 may be disposed on a top wall surrounding the accommodating cavity 1041, and the protruding block 1042 is fitted in the groove 1034, so that the sliding block 104 may slide along the rail body 1031 steadily and easily.

As shown in FIG. 3, in some embodiments of the present disclosure, the dust tapping-off device further includes a rolling element 107. The rolling element 107 is rotatably disposed in the accommodating cavity 1041, and also is mounted on the rail body 1031. The actuating rod 105 passes through walls surrounding the accommodating cavity 1041 and is connected to the rolling element 107. That is to say, the rolling element 107 may drive the actuating rod 105 to rotate.

When the filtering member 102 is cleaned, the sliding block 104 is driven to move along the rail body 1031, and the sliding block 104 may drive the rolling element 107 to roll. That is to say, during the movement of the sliding block 104 along the rail body 1031, the rolling element 107 keeps rotating, so that the actuating rod 105 may keep rotating, and thus the dust tapping-off member 106 may be driven to tap the filtering member 102. Thus, a user may complete the cleaning of the filtering member 102 only by operations of moving the sliding block 104 (without rotating the actuating rod 105 manually), and thereby the filtering member 102 may be cleaned conveniently and easily.

Advantageously, a part of the rolling element 107 may be fitted in the groove 1034, so that the rolling element 107 may roll steadily. The rolling element 107 may be configured as a rolling bearing.

As shown in FIG. 2, in an embodiment of the present disclosure, the actuating rod 105 may be perpendicular to the sliding rail 103. Thus, the structure of the dust tapping-off device may be reasonable. Specifically, the actuating rod 105 may extend along the radial direction of the clean air outlet 1011 as well.

In a specific embodiment of the present disclosure, as shown in FIG. 2, a first portion 1051 of the actuating rod 105 extends leftwards out of the sliding block 104, and a second portion 1052 of the actuating rod 105 extends rightwards out of the sliding block 104. Furthermore, two dust tapping-off members 106 are provided. One dust tapping-off member 106 is disposed on the first portion 1051 of the actuating rod 105, and the other dust tapping-off member 106 is disposed on the second portion 1052 of the actuating rod 105, such that a cleaning speed of the dust tapping-off device may be improved, and thereby the filtering member 102 may be cleaned rapidly.

Advantageously, one dust tapping-off member 106 may be movably fitted over the first portion 1051 of the actuating rod 105 along a left-right direction, and the other dust tapping-off member 106 may be movably fitted over the second portion 1052 of the actuating rod 105 along the left-right direction. The left-right direction is perpendicular to a paper in which FIG. 3 is, i.e. the actuating rod 105 extends along the left-right direction. Thus, different parts of the filtering member 102 may be tapped by moving the two dust tapping-off members 106 along the left-right direction.

The dust tapping-off member 106 may be configured as a cam, so that the structure of the dust tapping-off device may be reasonable.

As shown in FIG. 2 and FIG. 3, the handle 108 is disposed on the sliding block 104, and thus the user may drive the sliding block 104 to move conveniently and easily.

Advantageously, the handle 108 and the sliding block 104 may be formed integrally.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counterclockwise" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted", "connected", "coupled", "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "one embodiment", "another example", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples" in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A cleaning appliance, comprising:
    a body having a clean air outlet;
    a filtering member disposed at the clean air outlet; and
    a dust tapping-off device further including:
        a sliding rail disposed on an outer surface of the body and facing the clean air outlet;
        a sliding block slidably disposed on the sliding rail via an accommodating cavity therein, wherein both two opposite ends of the accommodating cavity are open for the sliding rail to pass through, a first surface of the sliding rail is provided with a groove, and a wall surrounding the accommodating cavity opposite to the first surface is provided with a protruding block fitted in the groove;
        a rolling element rotatably disposed in the accommodating cavity of the sliding block and disposed on the sliding rail;
        an actuating rod rotatably disposed on the sliding block and connected to the rolling element, wherein the actuating rod is configured to pass through walls surrounding the accommodating cavity; and a dust tapping-off member disposed on the actuating rod and configured for tapping the filtering member.

2. The cleaning appliance according to claim 1, wherein the clean air outlet is disposed on an upper surface of the body, the upper surface of the body is provided with a first engaging lug and a second engaging lug, the first engaging lug is provided with a first engaging groove and the second engaging lug is provided with a second engaging groove, the sliding rail includes a rail body, a first mounting portion and a second mounting portion, an upper end of the first mounting portion is connected to a first end of the rail body and a lower end of the first mounting portion is configured as a first fastener engaged in the first engaging groove, and an upper end of the second mounting portion is connected to a second end of the rail body and a lower end of the second mounting portion is configured as a second fastener engaged in the second engaging groove.

3. The cleaning appliance according to claim 1, wherein the actuating rod has a first portion extending leftwards out of the sliding block and a second portion extending rightwards out of the sliding block, two dust tapping-off members are provided, one of the two dust tapping-off members is disposed on the first portion of the actuating rod and the other one of the two dust tapping-off members is disposed on the second portion of the actuating rod.

4. The cleaning appliance according to claim 1, wherein the actuating rod is perpendicular to the sliding rail.

5. The cleaning appliance according to claim 1, wherein the dust tapping-off member is configured as a cam.

6. The cleaning appliance according to claim 1, wherein the dust tapping-off member further comprises a handle disposed on the sliding block.

* * * * *